(12) United States Patent
Lee et al.

(10) Patent No.: US 12,321,197 B2
(45) Date of Patent: Jun. 3, 2025

(54) ROLL-SLIDE DISPLAY DEVICE

(71) Applicant: LG Display Co., Ltd., Seoul (KR)

(72) Inventors: Shinsuk Lee, Gimpo-si (KR);
Junyoung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/966,577

(22) Filed: Oct. 14, 2022

(65) Prior Publication Data

US 2023/0205274 A1   Jun. 29, 2023

(30) Foreign Application Priority Data

Dec. 24, 2021   (KR) ........................ 10-2021-0187808

(51) Int. Cl.
*G06F 1/16*   (2006.01)
(52) U.S. Cl.
CPC .......... *G06F 1/1652* (2013.01); *G06F 1/1624* (2013.01); *G06F 1/1656* (2013.01)
(58) Field of Classification Search
CPC .... G06F 1/1652; G06F 1/1624; G06F 1/1656; G06F 1/1637; G09F 9/301; H10K 77/111; H10K 50/84; H10K 2102/311
See application file for complete search history.

(56) References Cited

U.S. PATENT DOCUMENTS

| | | | |
|---|---|---|---|
| 10,111,346 B2 * | 10/2018 | Seo ........................ | H05K 1/189 |
| 10,747,269 B1 * | 8/2020 | Choi ..................... | G06F 1/1641 |
| 10,798,831 B2 * | 10/2020 | Shin ...................... | H05K 5/0217 |
| 10,880,417 B1 * | 12/2020 | Song ..................... | H04M 1/0268 |
| 11,204,629 B1 * | 12/2021 | Kwak .................. | H04M 1/0268 |
| 11,256,295 B2 * | 2/2022 | Lee .......................... | G09F 9/301 |
| 11,314,285 B2 * | 4/2022 | Feng ..................... | G06F 1/1652 |
| 11,543,859 B2 * | 1/2023 | Kwak .................. | H04M 1/0237 |
| 11,561,576 B2 * | 1/2023 | Kang .................... | H04M 1/026 |
| 11,592,867 B2 * | 2/2023 | Liu ........................ | G06F 1/1624 |
| 11,662,780 B2 * | 5/2023 | Park ...................... | G06F 1/1616 |
| | | | 361/679.01 |
| 11,670,199 B2 * | 6/2023 | Kang .................... | G06F 1/1652 |
| | | | 361/679.01 |
| 11,768,519 B2 * | 9/2023 | Feng ..................... | G06F 1/1637 |
| | | | 361/679.27 |

(Continued)

FOREIGN PATENT DOCUMENTS

| KR | 10-1966787 B1 | 4/2019 |
|---|---|---|
| KR | 10-2020-0071604 A | 6/2020 |

*Primary Examiner* — Rockshana D Chowdhury
(74) *Attorney, Agent, or Firm* — Birch, Stewart, Kolasch & Birch, LLP

(57) ABSTRACT

A roll-slide display device according to an embodiment of the present disclosure includes a first frame, a second frame, and a third frame constituting an exterior and a flexible display unit including a first area that is coupled to the first frame, a second area that is coupled to the third frame, and a third area that is positioned between the first area and the second area, wherein the flexible display unit includes a display panel and a support frame disposed on a rear surface of the display panel and including a plurality of ribs that are elongated in one direction and a plurality of bridges that connect the plurality of ribs, wherein the roll-slide display device may implement and original state and an extended state by slidably moving the first frame leftward and rightward with respect to the second frame.

19 Claims, 13 Drawing Sheets

(56) References Cited

U.S. PATENT DOCUMENTS

| | | | |
|---|---|---|---|
| 11,800,663 B2 * | 10/2023 | Li | G06F 1/1624 |
| 11,805,605 B2 * | 10/2023 | Yoon | H05K 5/0017 |
| 11,810,482 B2 * | 11/2023 | Wu | G06F 1/1652 |
| 11,892,881 B2 * | 2/2024 | Ahn | G06F 1/1652 |
| 11,921,545 B2 * | 3/2024 | Feng | H04M 1/0268 |
| 2021/0336356 A1 * | 10/2021 | Choi | G06F 1/1652 |
| 2022/0198966 A1 * | 6/2022 | Park | G06F 1/1652 |

* cited by examiner

ROLL-SLIDE DISPLAY DEVICE

CROSS-REFERENCE TO RELATED APPLICATIONS

This application claims the benefit of and priority to Korean Patent Application No. 10-2021-0187808 filed on Dec. 24, 2021 in the Republic of Korea, the entire contents of which are hereby expressly incorporated by reference into the present application.

BACKGROUND

Technical Field

The present disclosure relates to a display device, and more particularly, to a roll-slide display device that has a flexible display and allows for an extension in size of a screen.

Discussion of the Related Art

Recently, portable terminals such as wireless terminals (e.g., cellphones), personal digital assistants (PDAs), portable multimedia players (PMPs), and electronic organizers are being reduced in sizes for portability. However, since users want to be provided with various pieces of information, such as text information, videos, still images, MP3, and games through a screen of the portable terminal, the screen of a display unit is required to be enlarged and greater in size (e.g., have an increased size). However, since a reduction in size of the portable terminal leads to a reduction in size of a display screen, there is a limit in satisfying both requirements of a reduced portable terminal size and an increased screen size.

As a way to overcome this limit, a flexible display device, such as a bendable display device, a foldable display device, or a roll-slide display device, has recently been developed.

The flexible display device can be implemented by forming a substrate of a plastic material. Since the flexible display device can be easily carried and at the same time, can implement a large screen by being expanded, it can be applied to various fields of application, such as a television and a monitor, as well as mobile devices, for example, a mobile phone, an e-book, and an electronic newspaper, etc.

SUMMARY OF THE DISCLOSURE

Recently, flexible displays that have sufficient elasticity and can be greatly deformed have been developed. Such a flexible display can be deformed to an extent that it can be rolled up.

The inventors of the present disclosure have invented a roll-slide display device. The roll-slide display device accommodates a rolled flexible display and can protrude (e.g., extend) the flexible display to an outside of a body thereof with a desired size. Accordingly, by using the flexible display, the roll-slide display device can have a more compact structure.

In order to use such a roll-slide display device, the display can be drawn from the body, and the display can be extended to have a size desired by a user, simultaneously with such a withdrawal of the display from the body. However, the inventors of the present disclosure have recognized the fact that when the roll-slide display device changes from a basic state (e.g., an original state or a non-expanded state) to an extended state (e.g., an unrolled state in which the display device is unrolled from a roller), deformation restoration of the display that is bent is delayed, so that wrinkles are generated. Winkles in the display include creases, folds or ridges in the display that can be caused movement of the display, such as by unrolling (e.g., sliding). The inventors of the present disclosure have recognized that occurrence of wrinkles can be alleviated by applying a plate bottom and a rolling belt, but a cost and process increase as multiple components are used.

Accordingly, the inventors of the present disclosure have invented a roll-slide display device having a new structure including a support frame in which a plate bottom and a rolling belt are integrated.

Accordingly, an aspect of the present disclosure is to provide a roll-slide display device capable of alleviating occurrence of wrinkles due to bending of a display while allowing for reduced cost and reduces processes to manufacture the roll-slide display device.

Another aspect of the present disclosure is to provide a roll-slide display device having a support frame in which plastic deformation does not occur even when folded.

Still another aspect of the present disclosure is to provide a roll-slide display device capable of preventing a pattern of the support frame from being viewed from a user viewing the roll-slide display device.

Objects of the present disclosure are not limited to the above-mentioned objects, and other objects, which are not mentioned above, can be clearly understood by those skilled in the art from the following descriptions.

A roll-slide display device according to an exemplary embodiment of the present disclosure includes a first frame, a second frame, and a third frame constituting an exterior and a flexible display unit including a first area that is coupled to the first frame, a second area that is coupled to the third frame, and a third area that is positioned between the first area and the second area, wherein the flexible display unit includes a display panel and a support frame disposed on a rear surface of the display panel and including a plurality of ribs that are elongated in one direction and a plurality of bridges that connect the plurality of ribs, wherein the roll-slide display device can implement a basic state (e.g., non-extended state or original state) and an extended state by slidably moving (e.g., sliding) the first frame leftward and rightward with respect to the second frame (e.g., along a longitudinal axis of the display unit).

Other detailed matters of the exemplary one or more embodiments are included in the detailed description and the drawings.

According to the present disclosure, when a roll-slide display device changes from a basic state to an extended state, it is possible to secure durability of the roll-slide display device by alleviating an occurrence of wrinkles due to bending of the roll-slide display device.

According to the present disclosure, it is possible to prevent operation failure of a roll-slide display device due to generation of wrinkles. That is, wrinkles can cause damage to the roll-slide display device, and the present disclosure avoids wrinkles, thereby avoiding damage to the roll-slide display device.

According to the present disclosure, flexibility and rigidity of a display panel can be simultaneously secured and effects of a simplified structure and a reduction in cost are provided due to a use of an integrated support frame.

The effects according to the present disclosure are not limited to the contents exemplified above, and more various effects are included in the present specification.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
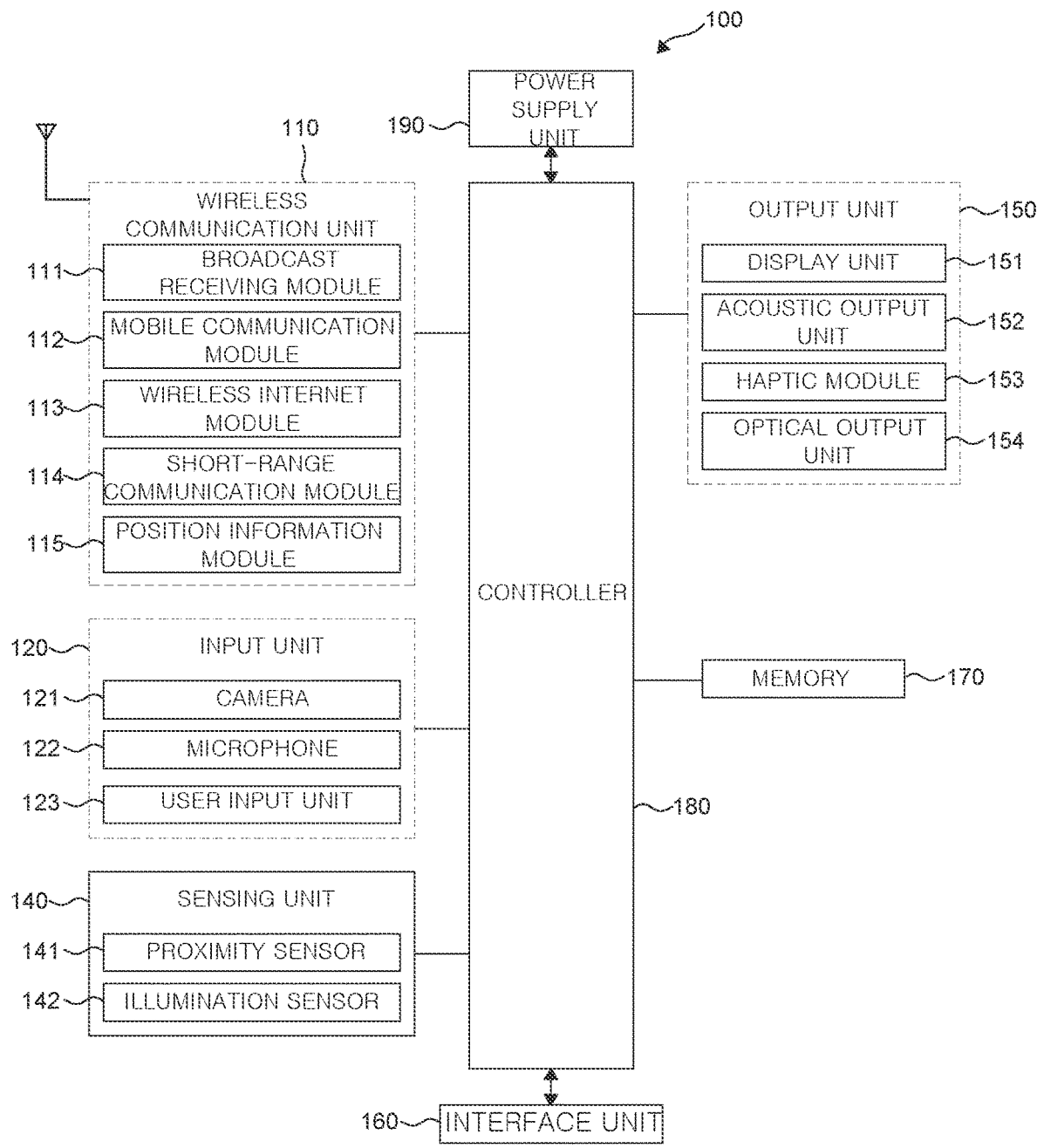
FIG. 1 is a block diagram illustrating a roll-slide display device according to a first embodiment of the present disclosure.

Advantages and characteristics of the present disclosure and a method of achieving the advantages and characteristics will be clear by referring to embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings. Further, all the components of each display device according to all embodiments of the present disclosure are operatively coupled and configured.

FIG. 1 is a block diagram illustrating a roll-slide display device according to a first embodiment of the present disclosure.

Referring to FIG. 1, a roll-slide display device 100 according to the first embodiment of the present disclosure can include a wireless communication unit 110, an input unit 120, a sensing unit 140, an output unit 150, an interface unit 160, a memory 170, a controller 180 (e.g., hardware embedded processor(s) or micro-processor(s)) and a power supply unit 190, and the like. Components illustrated in FIG. 1 are not essential to implement the roll-slide display device 100 and thus, the roll-slide display device 100 described herein can have more or fewer components than those listed above.

More specifically, the wireless communication unit 110 can include one or more modules that enables wireless communication between the roll-slide display device 100 and a wireless communication system, between the roll-slide display device 100 and another roll-slide display device, or between the roll-slide display device 100 and an external server. The wireless communication unit 110 can include one or more modules that connect the roll-slide display device 100 to one or more networks.

The wireless communication unit 110 can include at least one of a broadcast receiving module 111, a mobile communication module 112, a wireless Internet module 113, a short-range communication module 114, and a position information module 115.

First, referring to the wireless communication unit 110, the broadcast receiving module 111 of the wireless communication unit 110 can receive a broadcast signal and/or broadcast-related information from an external broadcast management server through a broadcast channel. The broadcast channel can include a satellite channel and a terrestrial channel. Two or more broadcast receiving modules 111 can be provided to the roll-slide display device 100 for simultaneous broadcast reception or broadcast channel switching for at least two broadcast channels.

The mobile communication module 112 can transmit and receive a wireless signal to and from at least one of a base station, an external terminal, and a server on a mobile communication network that is constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal can include various types of data depending on transmission and reception of a voice call signal, a video call signal, or a text/multimedia message.

The wireless Internet module 113 refers to a module for wireless Internet access, and can be embedded in or disposed external to the roll-slide display device 100. The wireless Internet module 113 can transmit or receive the wireless signal on the communication network based on wireless Internet technologies.

The wireless Internet technologies can be, for example, Wireless LAN (WLAN), Wireless-Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A) and the like. The wireless Internet module 113 can transmit and receive data based on at least one wireless Internet technology in a range including Internet technologies not listed above.

In view of that the wireless Internet access made by WiBro, HSDPA, HSUPA, GSM, CDMA, WCDMA, LTE, LTE-A and the like is based on a mobile communication network, the wireless Internet module 113 that performs the wireless Internet access through the mobile communication network can be understood as a kind of the mobile communication module 112.

The short-range communication module 114 is for short-range communication, and can support the short-range communication using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, and Wireless Universal Serial Bus (USB) technologies. The short-range communication module 114 can support, through short-range wireless area networks, wireless communication between the roll-slide display device 100 and a wireless communication system, wireless communication between the roll-slide display device 100 and another roll-slide display device 100, or wireless communication between the roll-slide display device 100 and a network where another mobile terminal (100 or external server) is positioned. The short-range wireless area networks can be short-range wireless personal area networks.

The position information module 115 is a module for obtaining a position (or a current position) of the roll-slide display device 100. A representative example of the position information module 115 can be a global positioning system (GPS) mobile or a Wi-Fi module. For example, if the roll-slide display device 100 utilizes the GPS module, the position of the roll-slide display device 100 can be obtained by using a signal transmitted from a GPS satellite. As another example, if the roll-slide display device 100 utilizes the Wi-Fi module, the position of the roll-slide display device 100 can be obtained based on information of a wireless access point (wireless AP) that transmits or receives the wireless signal to and from the Wi-Fi module. If necessary, the position information module 115 can perform a certain function of other modules of the wireless communication unit 110 to obtain data on the position of the roll-slide display device 100, additionally or in substitution. The position information module 115 is a module that is used to obtain a position (or a current position) of the roll-slide display device 100 and is not limited as a module that directly calculates or obtains a position of the roll-slide display device 100.

The input unit 120 can include cameras 121 or an image input unit to receive an image signal input, a microphone 122 or an audio input unit to receive an audio signal input, or a user input unit 123, for example, a touch key, a mechanical key, and the like to receive information from a user. Voice data or image data collected by the input unit 120 can be analyzed and processed as a control command of the user.

The camera 121 can process an image frame such as a still image or a moving image obtained by an image sensor in a video call mode or a capturing mode. The camera 121 can be one of a plurality of cameras 121 implemented in the roll-slide display device 100 and can include an ultra-wide angle camera, a wide-angle camera, a telephoto camera, a periscope camera, and the like. Further, the camera 121 can utilize a macro lens, which magnifies subjects close to the camera for close-up photography. The processed image frame can be displayed on a display unit 151 or stored in the memory 170. Meanwhile, a plurality of the cameras 121 provided in the roll-slide display device 100 can be disposed to form a matrix structure, and through the cameras 121 forming the matrix structure, a plurality of pieces of image information having various angles and focal points can be input to the roll-slide display device 100. Also, the plurality of cameras 121 can be disposed in a stereo structure to obtain a left image and a right image for implementing a stereo image.

The microphone 122 can process an external acoustic signal into electrical voice data. The processed voice data can be variously used based on a function performed (or an application program executed) in the roll-slide display device 100. Meanwhile, in the microphone 122, various noise removal algorithms can be implemented to remove noise generated in a process of receiving external acoustic signals. A plurality of microphones 122 can be implements in the roll-slide display device 100, and can be used to provide stereo sound. The output (e.g., audio data) from the microphone(s) 122 can be received by a memory 170.

The user input unit 123 is to receive information from a user. When information is input through the user input unit 123, the controller 180 can control an operation of the roll-slide display device 100 in response to the input information. The user input unit 123 can include a mechanical input means (or a mechanical key, for example, a button, a dome switch, a jog wheel, and a jog switch positioned on a front surface, a rear surface, or a side surface of the roll-slide display device 100, etc.) and a touch input means. By way of example, the touch input means can include a virtual key, a soft key, or a visual key displayed on a touch screen through a software process, or include a touch key in a portion other than the touch screen. The virtual key or the visual key can be displayed in a variety of forms on the touch screen and be formed of for example, graphics, texts, icons, or videos, or a combination thereof.

The sensing unit 140 can include one or more sensors to sense at least one of information in the roll-slide display device 100, surrounding environment information of the roll-slide display device 100, or user information. For example, the sensing unit 140 can include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, a finger scan sensor, an ultrasonic sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat detection sensor, or a gas detection sensor), and a chemical sensor (for example, an electronic nose, a healthcare sensor, a biometric sensor or the like). The roll-slide display device 100 described in the present disclosure can use a combination of pieces of information sensed in at least two sensors among the sensors.

The output unit 150 is to generate a visual output, an auditory output, or a tactile output, and can include at least one of the display unit 151, an acoustic output unit 152, a haptic module 153, and an optical output unit 154. The display unit 151 can form a layer structure or an integrated structure with a touch sensor to implement a touch screen. The touch screen can function as the user input unit 123 that provides an input interface between the roll-slide display device 100 and a user and simultaneously, provide an output interface between the roll-slide display device 100 and the user.

The acoustic output unit 152 can output audio data stored in the memory 170 or received from the wireless communication unit 110 in, for example, a call signal reception, a call mode or a recording mode, a voice recognition mode, and a broadcast reception mode. The acoustic output unit 152 can output an acoustic signal related to a function (for example, a call signal reception sound, a message reception sound and the like) performed in the roll-slide display device 100. The acoustic output unit 152 can include a receiver, a speaker, a buzzer and the like.

The haptic module 153 generates various tactile effects to be experienced by a user. Vibrations are a representative example of the tactile effects generated by the haptic module 153. An intensity and a pattern of the vibrations generated by the haptic module 153 can be controlled based on a selection of a user or setting of the controller 180. For example, the haptic module 153 can output a combination of different vibrations or output different vibrations in sequence.

The optical output unit 154 outputs a signal to announce an event occurrence using light of a light source of the roll-slide display device 100. An event occurring in the roll-slide display device 100 can be, for example, message reception, a call signal reception, missed call, alarms, schedule notification, e-mail reception, and application-based information reception.

The interface unit 160 functions as a passage with various types of external devices connected to the roll-slide display device 100. The interface unit 160 can include at least one of a wired/wireless headset port, an external charger port, a wired/wireless data port, a memory card port, a port connecting a device equipped with an identification module, an audio input/output (I/O) port, a video I/O port, and an earphone port. In response to the interface unit 160 being connected to an external device, the roll-slide display device 100 can perform an appropriate control associated with the connected external device.

The memory 170 can store data supporting various functions of the roll-slide display device 100. The memory 170 can store multiple application programs (or applications) run in the roll-slide display device 100, instructions and data for operations of the roll-slide display device 100. At least a portion of the application programs can be downloaded from an external server through wireless communication. At least a portion of the application programs can exist in the roll-slide display device 100 for basic functions (for example, call forwarding and outgoing functions and message receiving and outgoing functions) of the roll-slide display device 100 from the time of manufacture. Meanwhile, the application program can be stored in the memory 170, installed in the roll-slide display device 100, and run by the controller 180 to perform an operation (or function) of the roll-slide display device 100.

The controller 180 can generally control an overall operation of the roll-slide display device 100 in addition to operations related to the application programs. The controller 180 can process a signal, data, information, and the like input or output through the aforementioned components or run the application program stored in the memory 170, thereby providing appropriate information or function to a user or performing processing thereof.

Also, to run the application program stored in the memory 170, the controller 180 can control at least a portion of any of the components shown in FIG. 1, including all of the components of FIG. 1. Furthermore, to run the application program, the controller 180 can operate a combination of two or more components among the components included in the roll-slide display device 100.

The power supply unit 190 can supply power to various component included in the roll-slide display device 100 by receiving external power (e.g., from a power grid) or internal power under a control of the controller 180. The power supply unit 190 can include a battery 191. The battery can include a built-in battery or a removable battery. The battery can be a lithium-based battery or have any known battery composition.

At least a portion of the respective components can operate in cooperation with each other to implement an operation, a control, or a control method of the roll-slide display device 100 according to various embodiments as described below. Also, the operation, control, or control method of the roll-slide display device 100 can be implemented on the roll-slide display device 100 through running of at least one application program stored in the memory 170.

Figure 2A:
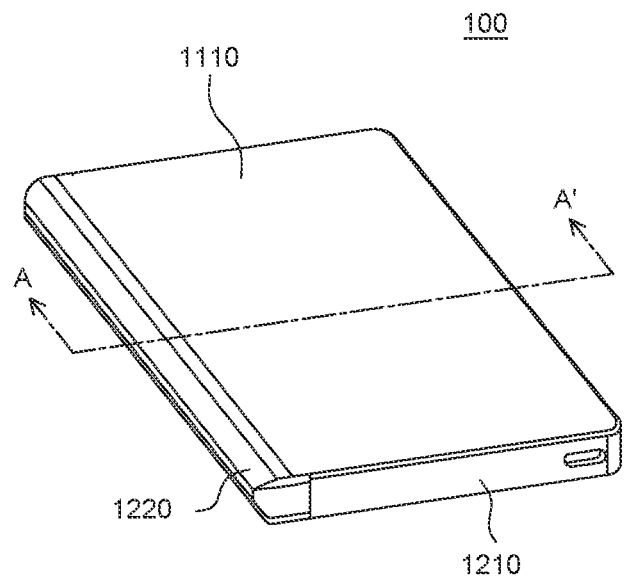
FIGS. 2A and 2B are perspective views of the roll-slide display device according to the first embodiment of the present disclosure.
Figure 2B:
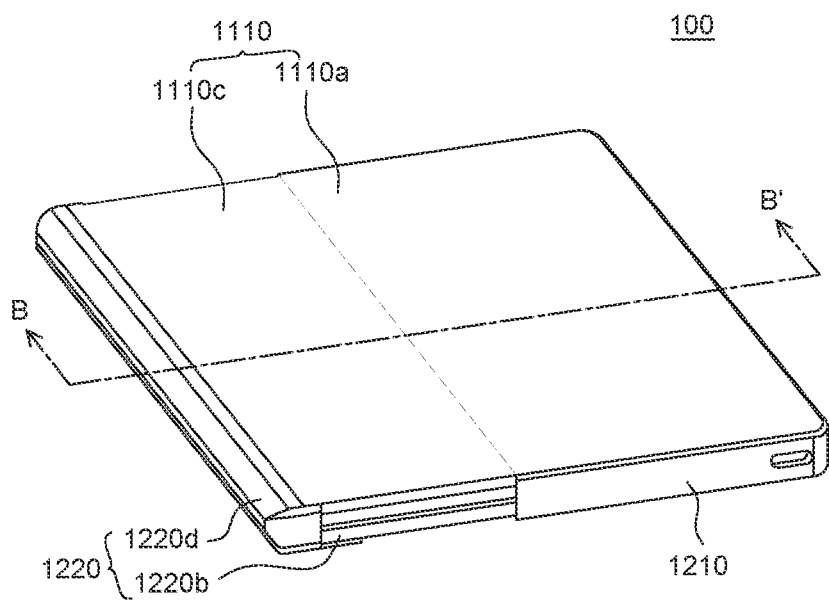

FIGS. 2A and 2B are perspective views of the roll-slide display device according to the first embodiment of the present disclosure.

Figure 3A:
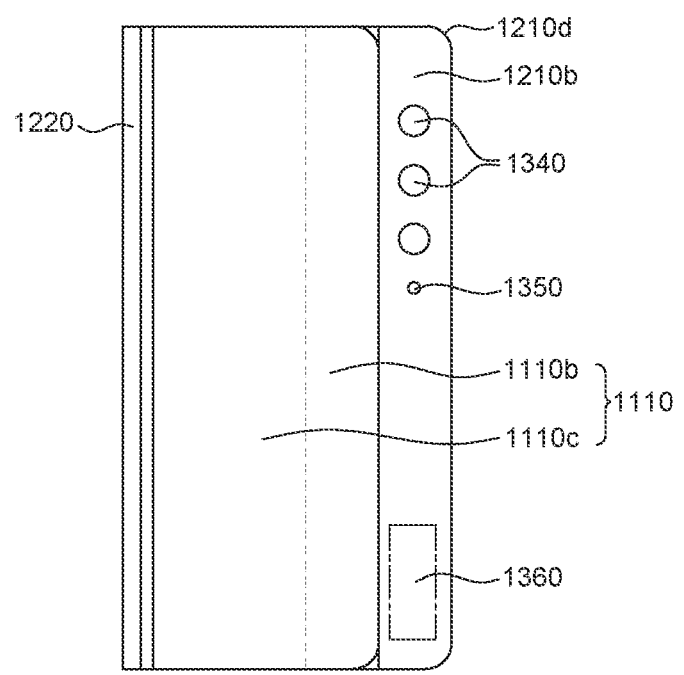
FIGS. 3A and 3B are rear views of the roll-slide display device according to the first embodiment of the present disclosure.
Figure 3B:
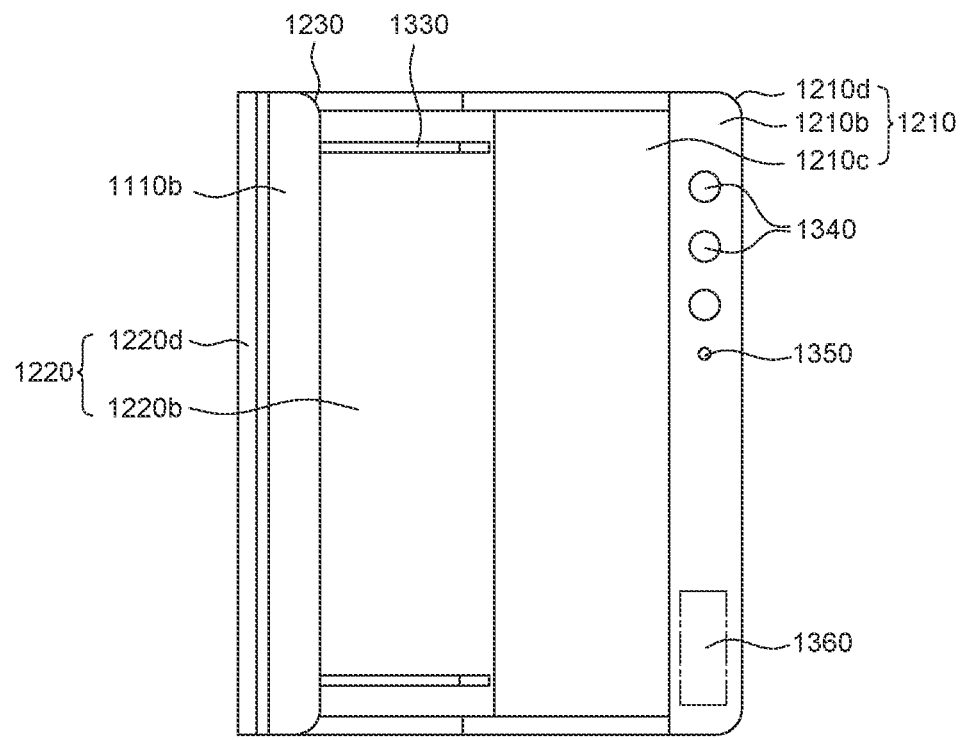

FIGS. 3A and 3B are rear views of the roll-slide display device according to the first embodiment of the present disclosure.

Figure 4A:
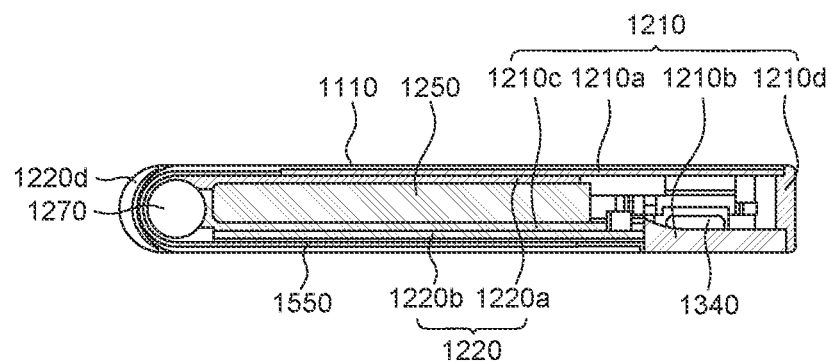
FIG. 4A is a cross-sectional view taken along line A-A' of FIG. 2A
Figure 4B:
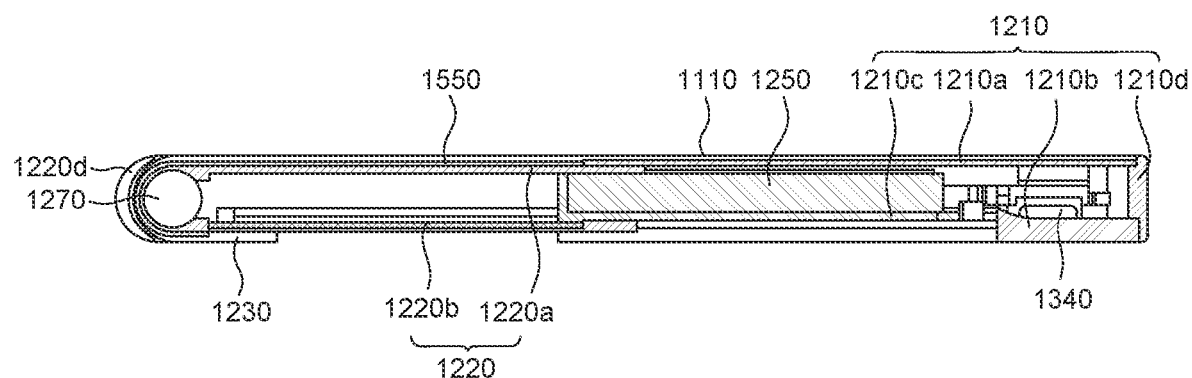
FIG. 4B is a cross-sectional view taken along line B-B' of FIG. 2B.

FIGS. 4A and 4B are cross-sectional views taken along line A-A' and line B-B' of FIGS. 2A and 2B, respectively.

FIGS. 2A and 3A show a first state of the roll-slide display device 100 according to the first embodiment of the present disclosure as an example, and FIGS. 2B and 3B show a second state of the roll-slide display device 100 according to the first embodiment of the present disclosure as an example.

FIG. 4A is a cross-sectional view taken along line A-A' of FIG. 2A, and schematically shows a cross-section of the roll-slide display device 100 in the first state.

FIG. 4B is a cross-sectional view taken along line B-B' of FIG. 2B, and schematically shows a cross-section of the roll-slide display device 100 in the second state, extending in a second direction, which is rightward (e.g., along a longitudinal axis of the roll-slide display device 100).

The first state can be a basic state of the roll-slide display device 100, and the second state can be an extended state of the roll-slide display device 100, but the present disclosure is not limited thereto.

The roll-slide display device 100 in the first state has a smaller size in a first direction, compared to the second state. In the roll-slide display device 100 in the second state, the size in the first direction is extended (e.g., longitudinally), and a size of a display unit 1110 positioned at the front surface thereof is greater compared to a case in the first state. For convenience of description, a direction in which the roll-slide display device 100 extends rightward is referred to as the second direction, a direction in which the roll-slide display device 100 is contracted (e.g., withdrawn) to switch from the second state to the first state is referred to as the first direction, and a direction perpendicular thereto (e.g., perpendicular to the first direction and to the second direction) is referred to as a third direction.

The roll-slide display device 100 of the present disclosure can switch from the first state in which the display unit 1110 is positioned at the front surface like a bar-shaped (e.g., rectangular shaped) mobile terminal, as shown in FIG. 2A, to the second state by extending a screen as shown in FIG. 2B. In the second state, an area of the display unit 1110 positioned at the front surface is enlarged (e.g., is increased in size), and an area of a third area 1110c of the display unit 1110 positioned at the rear surface is decreased as in FIG. 3B (e.g., the display unit 1110 is unrolled, such that a portion of the third area 1110c is rolled towards the front surface to now be a viewable display area for a user to view contents thereon). That is, the third area 1110c positioned at the rear surface in the first state can move in a front direction in the second state.

As described above, the roll-slide display device 100 of the present disclosure can use a flexible display in which the display unit 1110 is bent so that a position of the display unit 1110 can be changed. In this case, the flexible display refers to a lightweight, infrangible and durable display that is manufactured on a thin and flexible substrate so as to be curved, bendable, folded, twisted, or rolled like a paper while maintaining a characteristic of a typical flat panel display.

In this case, the flexible display unit 1110 can be deformed from a basic state to a bent state (e.g., a vertically or horizontally bent state) rather than a flat state. In this case, when external force is applied to the display unit 1110, the display unit 1110 can be deformed into a flat state (or less bent state) or a more bent state.

Meanwhile, the flexible display unit 1110 can be combined with a touch sensor to implement a flexible touch screen. When a touch is made to the flexible touch screen, the controller 180 (refer to FIG. 1) can perform a control corresponding to such a touch input. The flexible touch screen can be configured to detect a touch input not only in a basic state (e.g., non-deformed state) but also in a deformed state.

The touch sensor can detect a touch (or touch input) applied to the touch screen by using at least one of various touch methods such as a resistive method, a capacitive method, an infrared method, an ultrasonic method, and a magnetic field method. For instance, the touch sensor can include resistive sensor, a capacitive sensor, an infrared sensor, an ultrasonic sensor, and a magnetic field sensor.

As an example, the touch sensor can be configured to convert a change in pressure applied (e.g., by a user) to a specific region of the touch screen or a change in capacitance occurring in a specific region of the touch screen into an electrical input signal due to a user contacting/touching the touch screen with their hands. The touch sensor can be configured to detect a position and an area where a touch object applying a touch to the touch screen is touched by the touch sensor, a pressure at a time of touch, capacitance at a time of touch, and the like.

The roll-slide display device 100 according to the first embodiment of the present disclosure can include a deformation detection means (e.g., deformation detector) capable of detecting deformation of the flexible display unit 1110. Such a deformation detection means can be included in the sensing unit 140 (refer to FIG. 1).

The deformation detection means can be provided in the flexible display unit 1110 or a case to detect information related to deformation of the flexible display unit 1110. Here, the information related to deformation can be a direction in which the flexible display unit 1110 is deformed, a degree of deformation thereof, a position where it is deformed (e.g., where the deformation occurs), a time during which it is deformed, and an acceleration at which the deformed flexible display unit 1110 is restored, or the like. In addition, the information related to deformation can be various types of information detectable due to bending of the flexible display unit 1110.

The controller can change information displayed on the flexible display unit 1110 based on the information related to deformation of the flexible display unit 1110 that is detected by the deformation detection means, or generate control signals for controlling functions of the roll-slide display device 100 of the present disclosure.

Meanwhile, state transformation of the flexible display unit 1110 is not limited to those due to only external force. For example, when the flexible display unit 1110 is in the first state, it can be switched to the second state by a command of a user or an application. As described above, a driving unit can be included so that the flexible display unit 1110 is deformed without external force.

The flexible display unit 1110 according to the first embodiment of the present disclosure is bent at 180 degrees so that a portion thereof is positioned at the front surface of the roll-slide display device 100 and another portion thereof is positioned at the rear surface of the roll-slide display device 100. However, the flexible display unit 1110 can have a portion that is bent greater than 180 degrees. In this case, since an area of the flexible display unit 1110 is determined, if an area of the flexible display unit 1110 positioned at the front surface increases, an area of the flexible display unit 1110 positioned at the rear surface decreases.

Meanwhile, since the flexible display unit 1110 covers the rear surface as well as the front surface, a space in which an antenna can be mounted, which is conventionally implemented in a back case, can be limited. That is, an antenna on display (AOD) is a type of antenna in which a patterned electrode layer and a dielectric layer are layered to form a transparent film. The antenna on display (AOD) can be implemented thinner compared to a laser direct structuring (LDS) technique that is implemented by an existing copper nickel plating method, and thus, has advantages in which it is not exposed to the outside while rarely having influence on a thickness. In addition, signals can be transmitted and received in a direction in which the display unit 1110 is positioned, and in the roll-slide display device 100 in which the display unit 1110 is positioned at double sides as in the present disclosure, the antenna on display (AOD) can be used.

The roll-slide display device 100 of the present disclosure can include a first frame 1210, a second frame 1220, and a third frame 1230, and the first frame 1210, the second frame 1220, and the third frame 1230 can constitute an exterior (e.g., an exterior surface) of the roll-slide display device 100. The first frame 1210 can slidably move (e.g., slide) in the second direction with respect to the second frame 1220, and the third frame 1230 can slidably move (e.g., slide) in the first direction with respect to the second frame 1220.

The first frame 1210 and the second frame 1220 can include a front surface, a rear surface, and a side surface (or multiple side surfaces), and can constitute an exterior of the roll-slide display device 100, including an exterior of a hexahedron of the roll-slide display device 100.

The flexible display unit 1110 can be divided into a first area 1110*a*, a second area 1110*b*, and the third area 1110*c*. The first area 1110*a*, the second area 1110*b*, and the third area 1110*c* are separate from one another. The first area 1110*a* is positioned at one side (e.g., a first side) and can be fixed to the front surface of the first frame 1210. Also, the third area 1110*c* can be adjacent the first area 1110*a* in the first direction, can partially cover the front surface of the second frame 1220 and can partially cover the rear surface of the second frame 1220.

The second area 1110*b* positioned at the other side (e.g., a second side) of the flexible display unit 1110 can be positioned at the rear surface of the roll-slide display device 100 (e.g., the rear surface of the roll-slide display device 100 being opposite to the front surface of the roll-slide display device 100), and is not directly coupled to the second frame 1220, but can be coupled to the third frame 1230.

The third frame 1230 is a plate-shaped member (e.g., rectangular shaped, parallelogram) that is coupled to be slidably movable in the first direction from the rear surface of the second frame 1220.

As shown in FIG. 3B, a slide slot 1330 extending in the second direction is formed in the second frame 1220, and the third frame 1230 can move along the slide slot 1330. Although FIG. 3B illustrates that the slide slot 1330 is formed in the rear surface of the second frame 1220 in FIG. 3B, the slide slot 1330 can be formed in the side surface of the second frame 1220.

As described above, the flexible display unit 1110 according to the first embodiment of the present disclosure can include the first area 1110*a* that is fixed to the first frame 1210, the second area 1110*b* that is fixed to the third frame 1230, and the third area 1110*c* that is positioned between the first area 1110*a* and the second area 1110*b* and is disposed on the front surface or the rear surface according to the state of the roll-slide display device 100.

A curvature of the first area 1110*a* and the second area 1110*b* is not changed and maintains a flat basic state, but the third area 1110*c* can be bent at the other side of the second frame 1220 to be bent rearward. For instance, the first area 1110*a* and the second area 1110*b* can maintain a substantially flat shape while the third area 1110*c* is bent (e.g., around a roller 1270. When the first state switches (e.g., is changed to) to the second state, an area of the third area 1110*c* positioned in the first direction of the first area 1110*a* can increase. A bent position in the third area 1110*c* (or a portion of the third arear 1110*c* that is bent) can vary according to a sliding position of the second frame 1220. Since a foldable display device in a form of a book unfolded is repeatedly bent only at a specific position, only one location thereof receives force that is repeatedly applied thereto, and thus, there is a high risk of damage. On the other hand, since a bending portion of the flexible display unit 1110 of the present disclosure varies depending on the state of the roll-slide display device 100, fatigue due to deformation that is intensively applied to only one location can be reduced, so that damage to the flexible display unit 1110 can be prevented.

The first frame 1210 can include a first front portion 1210*a* (refer to FIGS. 4A and 4B) to which the first area 1110*a* of the flexible display unit 1110 is coupled, a first rear portion 1210*b* (refer to FIG. 3A) which is exposed to the outside even in the first state from the rear surface, and a second rear portion 1210*c* (refer to FIG. 3B) which is covered by the second area 1110*b* and the third area 1110*c* of the flexible display unit 1110 in the first state and is exposed (e.g., to the outside) only in the second state.

Since the first rear portion 1210*b* is exposed to the outside all the time, a camera 1340, a flash, a proximity sensor 1350, and the like can be disposed thereon.

Since a typical bar-shaped (e.g., rectangular shape or having a shape of any type of parallelogram) terminal has a display unit only on one side thereof, an object positioned at an opposite side of a user can be captured due to the presence of a camera at the opposite side of the display unit, and a camera can be required on both a rear surface and a front surface for the user's capturing. However, in the roll-slide display device 100 of the present disclosure, the flexible display unit 1110 can be positioned at the rear surface thereof, so that an object positioned at the opposite side of the user can be captured and the user can be captured using one camera 1340. The camera 1340 can include a plurality of cameras having different angles of view, such as a wide-angle, an ultra-wide angle, and telephoto. In addition to the camera 1340, the proximity sensor 1350, an acoustic output unit, and the like can be positioned, and an antenna 1360 can be implemented on the first rear portion 1210*b*.

The first frame 1210 can further include a side portion 1210*d* surrounding a circumference thereof (e.g., of the first frame 1210).

The side portion 1210*d* covers both sides in the third direction and a side surface of one side in the first direction except for an end portion in the first direction through which the second frame 1220 is drawn in and drawn out, and forms the exterior of the roll-slide display device 100. In the side portion 1210*d*, an interface unit for connection of a power port or an ear jack, or a user input unit such as a volume button can be disposed. When a metallic material is included in the side portion 1210*d* (e.g., the side portion 1210*d* is at least partially comprised of metal), the side portion 1210*d* can serve as an antenna. However, any portion of the roll-slide display device 100 and can simultaneously serve as an antenna.

The second frame 1220 can include a second front portion 1220*a* positioned at a rear surface of the first front portion 1210*a* and a third rear portion 1220*b* covering a rear surface of the second rear portion 1210*c* (refer to FIGS. 4A and 4B). The second front portion 1220*a* can support the rear surface of the extended flexible display unit 1110 of the front portion when switched to the second state. The second front portion 1220*a* can support the third area 1110*c* of the display unit 1110 in the second state.

The third area 1110*c* of the flexible display unit 1110 is wound on an end portion (e.g., lateral end or longitudinal end) of the second frame 1220 in the first direction, and a roller 1270 having a cylindrical shape (e.g., cylindrical cross-sectional shape) can be provided so that a wound portion of the flexible display unit 1110 can be gently bent while having a predetermined curvature.

The roller 1270 is positioned at an end portion in the first direction inside the second frame 1220 and comes into contact with an inner surface of the flexible display unit 1110, and in the case of slidable movement of the first frame 1210, the roller 1270 can rotate along with movement of the flexible display unit 1110 so as to slidably move when the flexible display unit 1110 moves from the rear surface to the front surface or moves from the front surface to the rear surface. That is, the roller 1270 can move at the same rate the flexible display unit 1110 moves As a portion of the flexible display unit 1110 that is wound around the roller 1270 is positioned at an end portion of the roll-slide display device 100 in the first direction, there is a risk of damage when an impact, such as dropping the roll-slide display device 100 is applied. For instance, if a wound portion of the flexible display unit 1110 is exposed, then this exposed portion can be damaged due to impact.

To prevent damage, the second frame 1220 can further include a side frame 1220*d* for protecting the flexible display unit 1110 wound around the roller 1270. That is, the side frame 1220*d* covers the portion of the flexible display unit 1110 wound around the roller 1270.

A battery 1250 can be disposed in a space between the second front portion 1220*a* and the second rear portion 1210*c*, and the battery 1250 can be a built-in battery or a replaceable battery. However, the battery 1250 can be disposed along any portion of the roll-slide display device 100.

In the second state, a support frame 1550 of the present disclosure can be further disposed between the flexible display unit 1110 and the second front portion 1220*a*.

The side frame 1220*d* can be formed of an opaque material or a transparent material, or can be composed by mixing an opaque material and a transparent material. When the side frame 1220*d* includes a transparent portion formed of a transparent material, an image or text output from the flexible display unit 1110 can be viewed through the transparent portion. In addition, a user input can be performed laterally using a touch sensor of the flexible display unit 1110. For a touch input, the side frame 1220*d* can include a conductive material, in part. A protrusion (e.g., projection) can be formed on a portion including the conductive material, so that a user can input a user command by touching the portion of the protrusion.

In addition, as in FIGS. 4A and 4B, the side frame 1220*d* can be configured to secure rigidity while having a natural curved surface by forming a center portion of an inner surface corresponding to a curvature of the flexible display unit 1110 wound around the roller 1270, which can be provided with any level of thickness.

In addition, since the side frame 1220*d* of the present disclosure can prevent a damage defect (e.g., damage) that occurs when a bent surface of the flexible display unit 1110 is exposed to the outside in an out-folding manner, durability of the roll-slide display device 100 can be improved.

Figure 5:
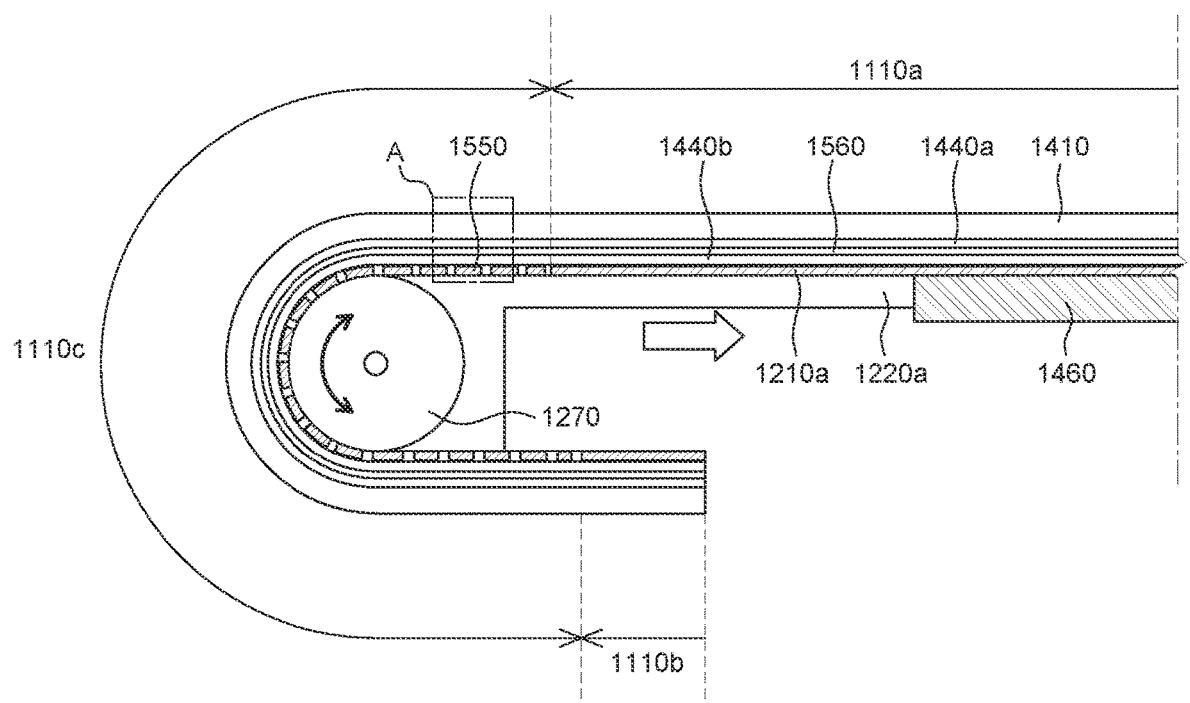
FIG. 5 is a view schematically showing a part of a cross-section of FIG. 4A.

FIG. 5 is a view schematically showing a part of a cross-section of FIG. 4A.

Figure 6:
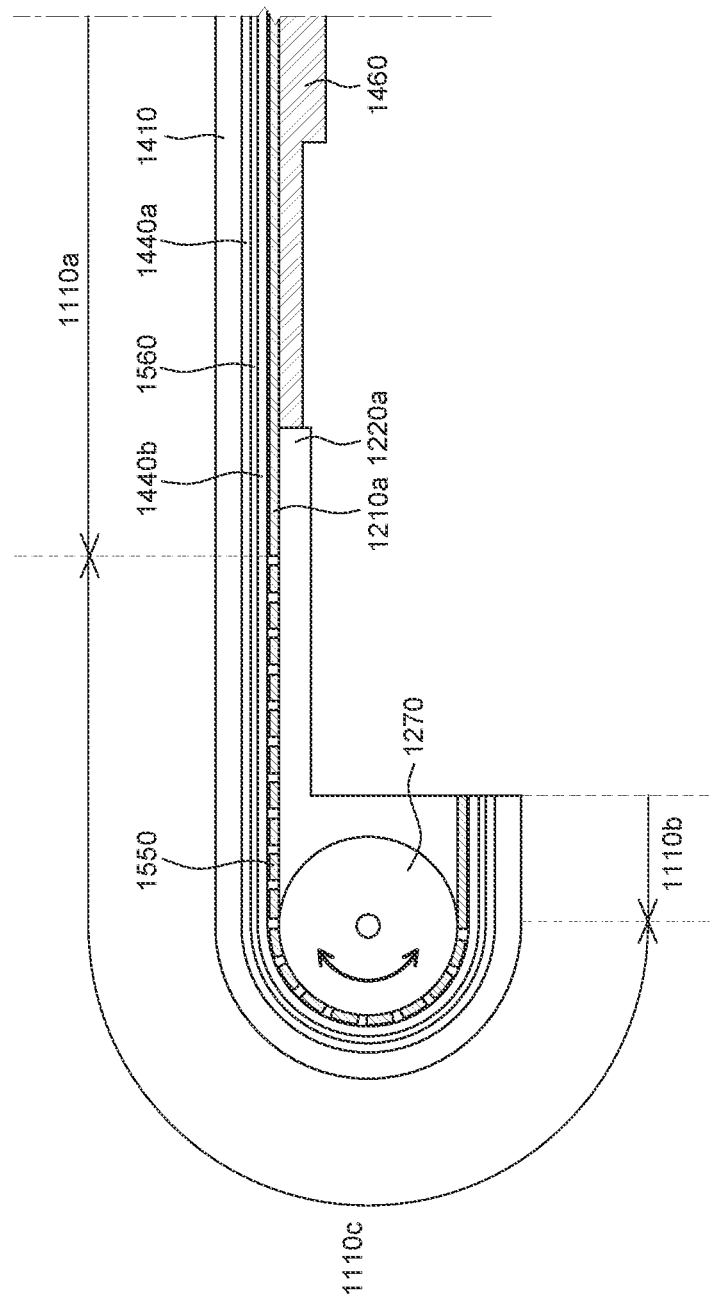
FIG. 6 is a view schematically showing a part of a cross section of FIG. 4B.

FIG. 6 is a view schematically showing a part of a cross section of FIG. 4B.

Figure 7:
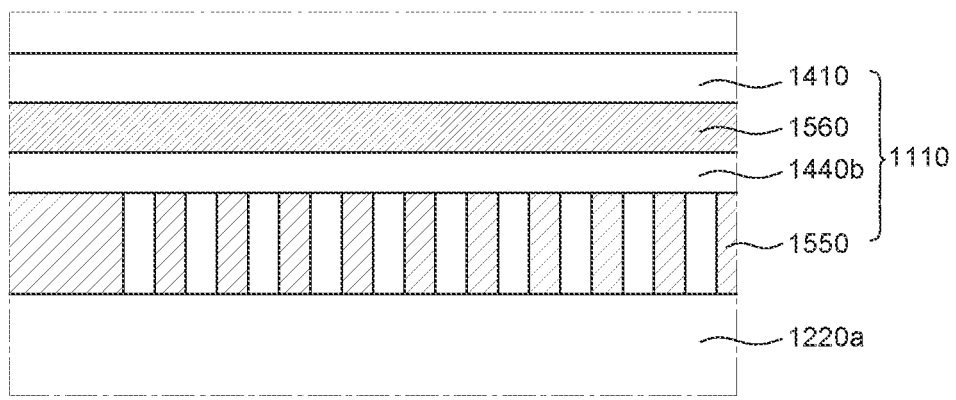
FIG. 7 is an enlarged view of part A of FIG. 5.

FIG. 7 is an enlarged view of part A of FIG. 5.

Figure 8:
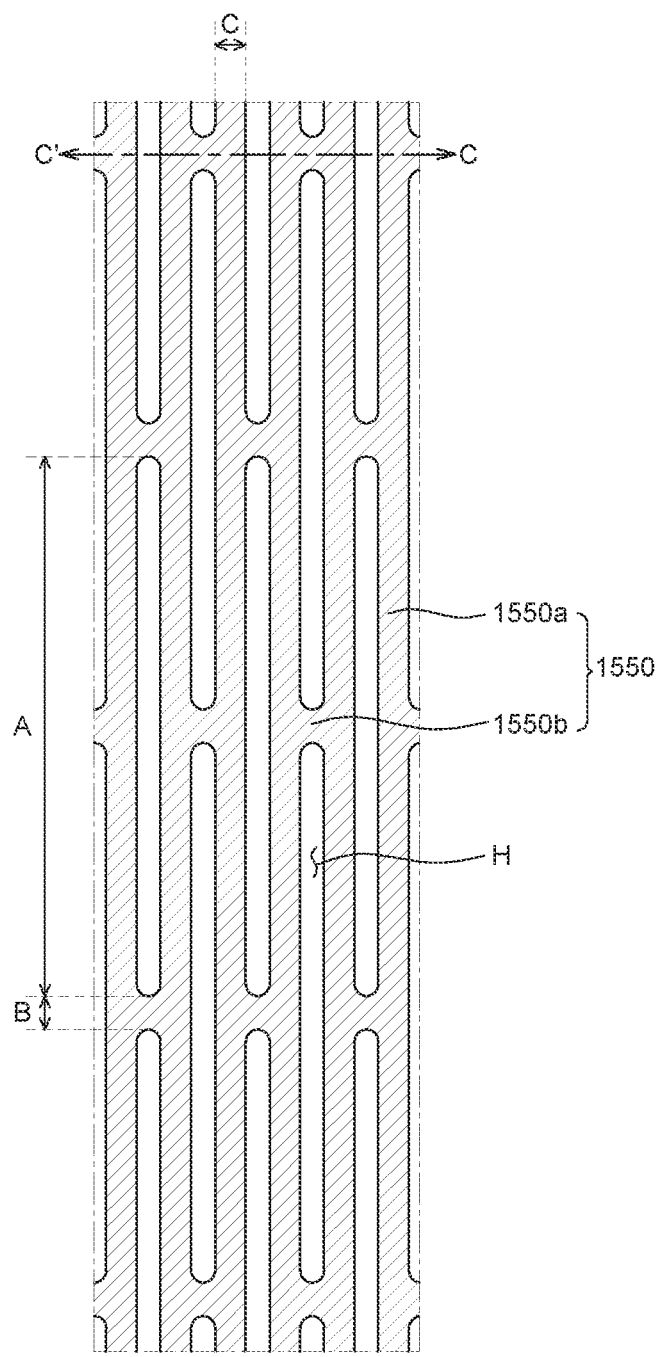
FIG. 8 is a plan view showing a part of a support frame.

FIG. 8 is a plan view showing a part of a support frame.

Figure 9:
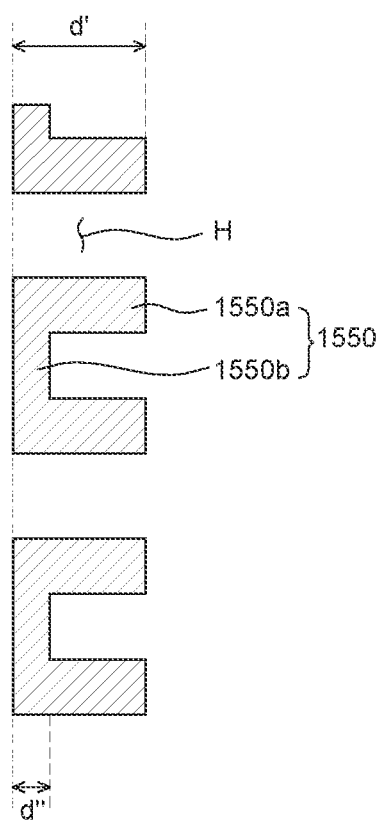
FIG. 9 is a cross-sectional view taken along line C-C' of FIG. 8.

FIG. 9 is a cross-sectional view taken along line C-C' of FIG. 8.

FIG. 5 schematically shows a part of a cross section of the roll-slide display device of the first embodiment of the present disclosure in the first state, and FIG. 6 schematically shows a part of a cross section of the roll-slide display device of the first embodiment of the present disclosure in the second state.

Referring to FIGS. 5 to 7, the flexible display unit 1110 according to the first embodiment can include a display panel 1410 that outputs an image and the support frame 1550 that supports a rear surface of the display panel 1410.

The display unit 1110 can be divided into the first area 1110*a* positioned at one side thereof, the second area 1110*b* positioned at the other side thereof, and the third area 1110*c* positioned between the first area 1110*a* and the second area 1110*b*.

The first area 1110*a* positioned at one side (e.g., a first side) of the display unit 1110 can be positioned above the first front portion 1210*a* of the first frame.

In addition, the third area 1110*c* adjacent from the first area 1110*a* in the first direction can be partially positioned above the second front portion 1220*a* of the second frame and can be partially positioned below the third rear portion of the second frame.

The second area 1110*b* positioned at the other side (e.g., a second side) of the flexible display unit 1110 is positioned at the rear surface of the roll-slide display device and can be coupled to the third frame without being directly coupled to the second frame.

The second front portion 1220*a* of the second frame can be disposed on a rear surface of the support frame 1550.

As the display panel 1410, one of various display panels, such as an organic light emitting display panel and a liquid crystal display panel can be used.

Although not shown in detail in the drawings, the display panel 1410 is a component to display an image to a user and can include a plurality of sub-pixels.

In the display panel 1410, a plurality of scan lines and a plurality of data lines cross each other, and each of the plurality of sub-pixels can be connected to the scan lines and data lines. In addition, each of the plurality of sub-pixels can be connected to a high potential power line, a low potential power line, an initialization signal line, a light emission control signal line, and the like.

The sub-pixels are minimum units constituting a screen, and each of the plurality of sub-pixels can include a light emitting element and a pixel circuit for driving the same. The plurality of light emitting elements can be defined differently depending on a type of the display panel 1410. For example, when the display panel 1410 is an organic light emitting display panel, the light emitting element can be an organic light emitting element including an anode, a light emitting unit, and a cathode. Hereinafter, it is assumed that the light emitting element is an organic light emitting element, but a type of the light emitting element is not limited to the organic light emitting element.

The pixel circuit is a circuit for controlling driving of the light emitting element. The pixel circuit can include, for example, a plurality of transistors and capacitors, but is not limited thereto.

Also, the display panel 1410 can have flexibility so as to be bent along with bending of the roll-slide display device.

A driving unit such as a motor can slidably move the first frame in the second direction (an arrow direction shown in FIG. 5) relative to the second frame, and at the same time, slidably move the third frame in the first direction relative to the second frame.

If the second frame moves by a first distance when the first state is switched to the second state, the flexible display unit 1110 can move by a second distance corresponding to twice the first distance. The third frame also needs to move by the same distance (e.g., the second distance) as the second frame from the second frame so that an end portion of the flexible display unit 1110 moves by the second distance.

Accordingly, the driving unit can use a linear motor operating in a linear direction (e.g., along the longitudinal axis of the display panel 1410 and/or the flexible display unit 1110) to compensate for such deformation. When the driving unit is contracted, since a length thereof cannot be greater than a width of the first frame in the third direction, the linear motor can be configured with at least three stages, but is not limited thereto.

Only one driving unit can be provided, but a pair of driving units can be provided on both sides in the third direction so that a change in state of the roll-slide display device is stably made. A component such as a battery or the like can be disposed between the pair of driving units. Further, any number of driving unit (e.g., motors) may be provided to enhance moment of the roll-slide display device 100).

Meanwhile, the roll-slide display device of the present disclosure is characterized in that the support frame 1550 is disposed on the rear surface of the display panel 1410, and a plate top 1560 is disposed between the display panel 1410 and the support frame 1550.

A first adhesive film 1440*a* can be disposed between the display panel 1410 and the plate top 1560. Also, a second adhesive film 1440*b* can be disposed between the plate top 1410 and the support frame 1550. However, the present disclosure is not limited thereto, and as shown in FIG. 7, the first adhesive film 1440*a* can be omitted.

The first and second adhesive films 1440*a* and 1440*b* can be formed of an optically clear adhesive film (OCA film), but are not limited thereto. For instance, the first and second adhesive films 1440*a* and 1440*b* can be formed of a pressure sensitive adhesive (PSA), an epoxy resin and the like.

For example, when the roll-slide display device is changed from the basic state of FIG. 5 to the extended state of FIG. 6, deformation restoration of the bent display unit 1110 is delayed, so wrinkles can be generated therein. That is, when a stack of the display unit 1110 that is bent on a side surface of the roller 1270 in the basic state (e.g., original state) of the roll-slide display device changes to the extended state, a wrinkle shape can appear due to a delay in recovery of a deformed portion.

However, in the present disclosure, the support frame 1550 is disposed on the rear surface of the display panel 1410 to rigidly support the display panel 1410, so that flatness of the display panel 1410 can be maintained all the time and support by a user's touch press can also be strengthened.

Accordingly, the support frame 1550 can be formed of a metallic material, such as copper (Cu), aluminum (Al), stainless steel (SS) and stainless use steel (SUS) having rigidity.

The support frame 1550 includes a predetermined pattern, but is not limited thereto.

In particular, in the support frame 1550 according to the first embodiment of the present disclosure, by integrating functions of a plate bottom and a rolling belt, flexibility and rigidity of the display panel 1410 can be simultaneously secured while effects of a simplified structure and a reduction in cost are provided.

That is, the roll-slide display device additionally needs to have a component that functions as a support on the rear surface of the display panel. In order for a slide-out, that is, in order for the roll-slide display device to maintain flatness of the flexible display panel in an extended state of the roll-slide display device and to support rigidity against pressing by a user's touch, a plate configuration is required.

Accordingly, a plate bottom and a rolling belt can be attached to the rear surface of the display panel. For example, the plate bottom can be disposed on the rear surface of the display panel, and the rolling belt can be disposed on a rear surface of the plate bottom.

The plate bottom can provide flexibility to the display panel by forming a micro-pattern in a longitudinal direction, and the plate bottom can bridges on a metal plate, such as SUS. In addition, the plate bottom can maintain curvature and rigid support in the longitudinal direction. As shown in FIGS. 8 and 9, the support frame can include a micro-pattern in the form of a plurality of ribs 1550*a* connecting a plurality of bridges 1550*b* together.

A plurality of rolling belts can be disposed in the longitudinal direction to support rigidity of the display panel in a width direction.

However, when multiple layers of the plate bottom and the rolling belt are added, it is disadvantageous in that a thickness of the roll-slide display device increases, which causes an increase in cost and additional processes to produce the support frame 1550.

Accordingly, the first embodiment of the present disclosure is characterized in that the support frame 1550 in which functions of the plate bottom and the rolling belt are integrated is attached to the rear surface of the display panel 1410.

The support frame 1550 of the present disclosure is characterized in that longitudinal patterns including bridges are formed at wide intervals (e.g., largely spaced intervals) in the metal plate such as SUS.

Accordingly, even in the extended state of the roll-slide display device, by supporting the rear surface of the display panel 1410 and maintaining rigidity thereof, lifting of the display panel 1410 and generation of wrinkles of the display panel 1410 around a bending thereof can be alleviated. In addition, even in the case of a user's touch, it is possible to perform a function of supporting rigidity against pressing. In addition, the use of the integrated support frame 1550 has effects of a simplified structure and a reduction in cost.

In particular, by making a bridge portion relatively thin compared to other portions, it is possible to alleviate stress concentration during folding so that plastic deformation does not occur, which will be described in detail with reference to FIGS. 8 and 9.

Meanwhile, the plate top 1410 can be formed of a metal plate, such as SUS, to prevent transfer, that is, to prevent a pattern of the support frame 1550 from being viewed, and for restoration.

FIG. 8 is a plan view showing a part of a support frame.
FIG. 9 is a cross-sectional view taken along line C-C' of FIG. 8.

Referring to FIGS. 8 and 9, the support frame 1550 of the first embodiment of the present disclosure can be configured to include a plurality of ribs (bars, rods or sticks) 1550*a* that are elongated in one direction and a plurality of bridges 1550*b* that connect the plurality of ribs 1550*a*.

The support frame 1550 can have a plate shape for rigid support on the rear surface of the display panel.

The support frame 1550 can be formed of a metallic material such as SUS for corrosion prevention and strength.

The support frame 1550 can be formed of a material having increased yield stress by cold rolling to prevent plastic deformation during folding.

The ribs 1550a can have a long and thin rod shape, but the present disclosure is not limited thereto. Further, the ribs 1550a can have a square shape.

Holes H that are empty spaces can be provided between the ribs 1550a.

The bridge 1550b connects the plurality of ribs 1550a, and a plurality of the holes H can be partitioned by the plurality of ribs 1550a and the plurality of bridges 1550b.

In the bridges 1550b, a width and an interval thereof can be designed so that plastic deformation does not occur in the case of folding with an R value and sliding of the third area 1110c of the flexible display unit 1110. That is, when the support frame 1550 is folded, a maximum stress value can be designed to be smaller than a yield stress value of a material.

However, since flexibility and rigidity are in a trade-off relationship, the support frame 1550 can be designed in consideration of this.

For example, when a length A of the holes H is large, flexibility can be increased and folding stress can be lowered, but rigidity can be decreased.

In addition, when a width B of the bridges 1550b is large, rigidity can be increased and folding stress can be lowered, and when the width B is small, stress can be concentrated, thereby increasing folding stress and lowering rigidity.

In addition, when a width C of the ribs 1550a is large, rigidity can be increased, but folding stress can also be increased.

The ribs 1550a and the bridges 1550b can be manufactured using an etching process or a pressing process. For instance, the support frame 1550 can be formed by pressing a metal plate with a die, which forms the ribs 1550a, the bridges 1550b and the holes H. Alternative, support frame 1550 can be formed by etching a metal plate, which forms the ribs 1550a, the bridges 1550b and the holes H Meanwhile, it is preferable to increase a thickness d' of the support frame 1550 in order to secure rigidity, but when the thickness d' is increased to secure rigidity, plastic deformation can occur due to folding in the bridge 1550b.

In order to improve this, in the present disclosure, flexibility of the bridge 1550b can be secured by partially etching only the bridge 1550b of the support frame 1550 to reduce a thickness d" of. That is, by making the thickness d" of the bridge 1550b smaller than the thickness d' of the rib 1550a, stress concentration during folding can be alleviated and plastic deformation can be prevented. At this time, stress applied to the bridge(s) 1550b at a time of folding and sliding can be less than yield stress.

For example, the thickness d" of the bridge(s) 1550b can be ⅓ times thinner than the thickness d' of the rib(s) 1550a, but is not limited thereto.

It was conformed that there was no abnormality in static evaluation for 120 hours in a high-temperature, high-humidity environment of 60° C. and 90%, and it was confirmed that there was no abnormality in 150 K (150,000) times even in dynamic evaluation at room temperature.

Meanwhile, in the present disclosure, a plate top can be applied to prevent the pattern of the support frame 1550 from being viewed, but the present disclosure is not limited thereto, and a foam or elastomer in a foaming (e.g., foamed) form can be applied, which will be described in detail with reference to FIGS. 10 to 12.

Figure 10:
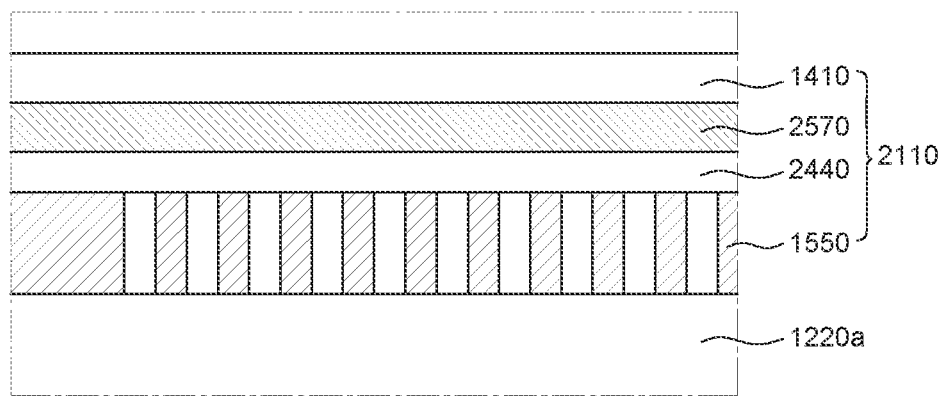
FIG. 10 is a cross-sectional view illustrating a partial configuration of a display panel according to a second embodiment of the present disclosure.

FIG. 10 is a cross-sectional view illustrating a partial configuration of a display panel according to a second embodiment of the present disclosure.

The second embodiment of the present disclosure of FIG. 10 differs from the first embodiment of FIGS. 1 to 9 only in terms of including a foam 2570 instead of a plate top, and other configurations thereof are substantially the same. For instance, the foam 2570 can be disposed between the support frame 1550 and the display panel 1410. Thus, a duplicate description will be omitted. The same reference numerals are used for the same components.

FIG. 10 illustrates a portion of a display unit 2110 and the second front portion 1220a of the second frame on a rear surface of the display unit 2110 according to the second embodiment of the present disclosure.

Referring to FIG. 10, the display unit 2110 according to the second embodiment of the present disclosure can include the display panel 1410 that outputs an image (or a plurality of images) and the support frame 1550 that supports a rear surface of the display panel 1410.

The second front portion 1220a of the second frame can be disposed on the rear surface of the support frame 1550.

A roll-slide display device according to the second embodiment of the present disclosure is characterized in that a foam 2570 in a foaming form is disposed between the display panel 1410 and the support frame 1550, instead of a plate top. The foam 2570 may be an open-cell foam, a closed-cell foam, a high density foam, a polyethylene foam, cellulose, a polyester foam, and the like.

That is, by disposing the foam 2570 in the foaming foam on the rear surface of the display panel 1410, a physical transfer phenomenon in which a discontinuous pattern shape of the support frame 1550 is visually recognized by the display panel 1410 can be prevented.

The foam 2570 can also be formed of a resin, such as acrylic.

Also, an adhesive film 2440 can be disposed between the foam 2570 and the support frame 1550.

The adhesive film 2440 can be formed of an optically clear adhesive film (OCA film), but is not limited thereto.

According to the second embodiment of the present disclosure as described above, by integrating functions of a plate bottom and a rolling belt in the support frame 1550, flexibility and rigidity of the display panel 1410 can be simultaneously secured, while effects of a simplified structure and a reduction in cost are provided.

The support frame 1550 of the present disclosure is characterized in that longitudinal patterns including bridges are formed at wide intervals in the metal plate, such as SUS or SS.

In addition, by making a bridge portion of the support frame 1550 relatively thin compared to other portions of the support frame 1550, it is possible to alleviate stress concentration during folding, so that plastic deformation does not occur.

Figure 11:
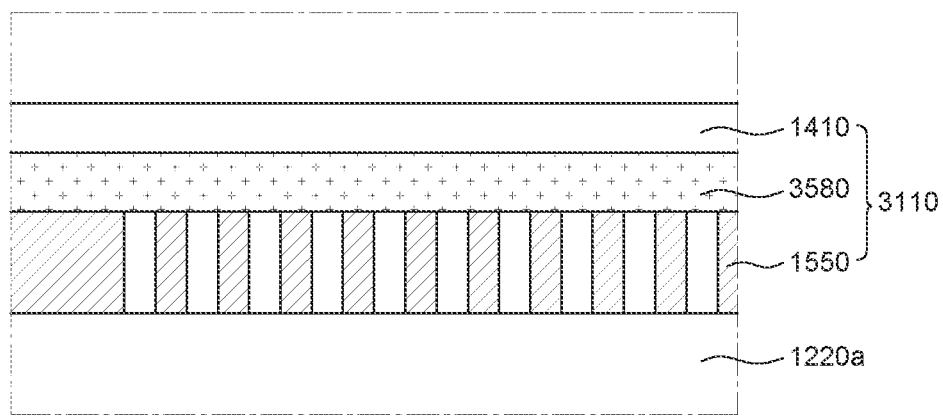
FIG. 11 is a cross-sectional view illustrating a partial configuration of a display panel according to a third embodiment of the present disclosure.

FIG. 11 is a cross-sectional view illustrating a partial configuration of a display panel according to a third embodiment of the present disclosure.

The third embodiment of the present disclosure of FIG. 11 differs from the first embodiment of FIGS. 1 to 9 only in terms of including an elastomer 3580 instead of a plate top and the elastomer 3580 can be used instead of the foam 2570, and other configurations thereof are substantially the same. Thus, a duplicate description will be omitted. The same reference numerals are used for the same components.

FIG. 11 illustrates a portion of a display unit 3110 and the second front portion 1220a of the second frame on a rear surface of the display unit 3110 according to the third embodiment.

Referring to FIG. 11, the display unit 3110 according to the third embodiment of the present disclosure can include the display panel 1410 that outputs an image and the support frame 1550 that supports the rear surface of the display panel 1410.

A roll-slide display device according to the third embodiment of the present disclosure is characterized in that the elastomer 3580 is disposed between (e.g., directly between) the display panel 1410 and the support frame 1550 instead of a plate top (e.g., while contacting the display panel 1410 at a first side of the elastomer 3580 and contacting the support frame 1550 at a second side of the elastomer 3580, opposite to the first side). That is, by disposing the elastomer 3580 on the rear surface of the display panel 1410, the elastomer 3580 can secure rolling characteristics and improve a transfer phenomenon by utilizing flexible characteristics.

Since the elastomer 3580 can be directly attached to the support frame 1550 by hot pressing with a high molecular compound, such as rubber or silicone, the above-described adhesive film can be omitted.

Figure 12:
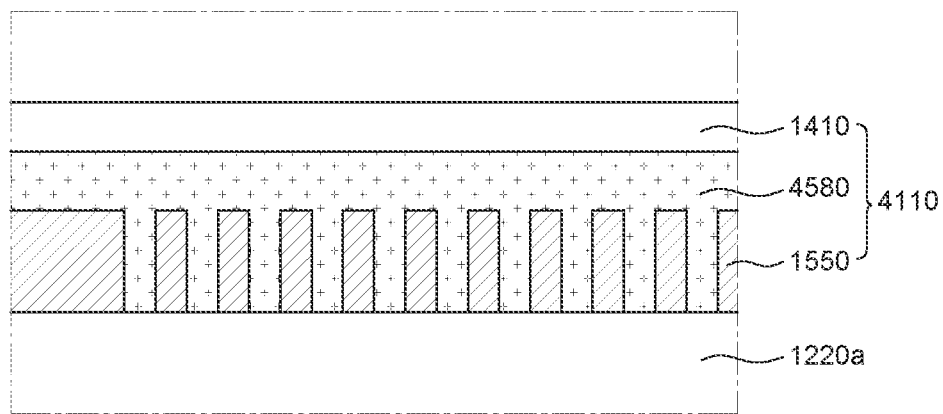
FIG. 12 is a cross-sectional view illustrating a partial configuration of a display panel according to a fourth embodiment of the present disclosure.

FIG. 12 is a cross-sectional view illustrating a partial configuration of a display panel according to a fourth embodiment of the present disclosure.

The fourth embodiment of the present disclosure of FIG. 12 differs from the third embodiment of FIG. 11 only in terms of a configuration of an elastomer 4580, and other configurations thereof are substantially the same. Thus, a duplicate description will be omitted. The same reference numerals are used for the same components.

FIG. 12 illustrates a portion of a display unit 4110 and the second front portion 1220*a* of the second frame on a rear surface of the display unit 4110 according to the fourth embodiment.

Referring to FIG. 12, the display unit 4110 according to the fourth embodiment of the present disclosure can include the display panel 1410 that outputs an image and the support frame 1550 that supports the rear surface of the display panel 1410.

A roll-slide display device according to the fourth embodiment of the present disclosure is characterized in that the elastomer 4580 is disposed between the display panel 1410 and the support frame 1550 instead of a plate top.

In particular, the elastomer 4580 of the fourth embodiment of the present disclosure is characterized in that it also fills empty spaces of the support frame 1550, that is, hollow spaces between the ribs 1550*a* of the support frame 1550. Accordingly, it is possible to prevent defects due to an inflow of foreign substances.

Since the elastomer 4580 can be directly attached to the support frame 1550 by hot pressing with a polymer compound, such as rubber or silicone, the above-described adhesive film can be omitted.

The embodiments of the present disclosure can also be described as follows:

According to an aspect of the present disclosure, there is provided a roll-slide display device. The roll-slide display device includes a first frame, a second frame, and a third frame constituting an exterior and a flexible display unit including a first area that is coupled to the first frame, a second area that is coupled to the third frame, and a third area that is positioned between the first area and the second area, wherein the flexible display unit can include, a display panel and a support frame disposed on a rear surface of the display panel and including a plurality of ribs that are elongated in one direction and a plurality of bridges that connect the plurality of ribs, wherein the roll-slide display device can implement a basic state and an extended state by slidably moving the first frame leftward and rightward with respect to the second frame (e.g., along a longitudinal axis of the display unit).

The roll-slide display device can further include a plate top disposed between the display panel and the support frame.

The roll-slide display device can further include a first adhesive film disposed between the display panel and the plate top and a second adhesive film disposed between the plate top and the support frame.

The first adhesive film and the second adhesive film can be made of an optically clear adhesive film (OCA film).

The first area can be fixed to a front surface of the first frame, and a portion of the third area adjacent in a first direction at the first area can cover a front surface of the second frame and another portion of the third area can cover a rear surface of the second frame.

The second area can be positioned at a rear surface of the roll-slide display device and can be coupled to the third frame without being directly coupled to the second frame.

The first frame can include a first front portion to which the first area is coupled, a first rear portion exposed to an outside even in the basic state at a rear surface and a second rear portion covered by the second area and the third area in the basic state and exposed in the extended state.

The second frame can include a second front portion positioned at a rear surface of the first front portion and a third rear portion covering a rear surface of the second rear portion, wherein the second front portion can support the third area of the flexible display unit in the extended state.

The support frame can be disposed between the flexible display unit and the second front portion in the extended state.

The support frame can be made of any one of stainless use steel (SUS), copper (Cu), and aluminum (Al).

The ribs can have a long and thin rod shape, and a plurality of holes that are empty spaces can be provided between the plurality of ribs.

The bridges can connect the plurality of ribs, and the holes can be partitioned by the plurality of ribs and the plurality of bridges.

The bridges can have a thickness smaller than a thickness of the ribs.

The roll-slide display device can further include a foam disposed between the display panel and the support frame and an adhesive film disposed between the foam and the support frame.

The foam can be made of acrylic.

The roll-slide display device can further include an elastomer disposed between the display panel and the support frame, and the elastomer can be made of rubber or silicone and is directly attached to the support frame through hot press.

The elastomer can fill the empty spaces between the ribs.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Although the embodiments of the present disclosure have been described in detail with reference to the accompanying drawings, the present disclosure is not limited thereto and can be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A roll-slide display device, comprising:
   a first frame;
   a second frame;
   a third frame, the first frame, the second frame and the third frame constituting an exterior of the roll-slide display device; and
   a flexible display unit including:
      a first area fixed directly to the first frame;
      a second area coupled to the third frame;
      a third area positioned between the first area and the second area,
      a display panel; and
      a support frame disposed on a rear surface of the display panel and including a plurality of ribs that are elongated in one direction and a plurality of bridges that connect the plurality of ribs to each other and are integrated with the plurality of ribs to form one body,
   wherein the roll-slide display device is movable between an original state and an extended state by sliding the first frame with respect to the second frame,
   wherein the first frame includes a first front portion coupled to the first area, a first rear portion positioned at a rear surface of the roll-slide display device and exposed to an outside in the original state and in the extended state, and a second rear portion covered by the second area and the third area in the original state and which is in exposed the extended state, and
   wherein the first area is fixed directly to a front surface of the first frame.

2. The roll-slide display device of claim 1, further comprising a plate top disposed between the display panel and the support frame.

3. The roll-slide display device of claim 2, further comprising:
   a first adhesive film disposed between the display panel and the plate top; and
   a second adhesive film disposed between the plate top and the support frame.

4. The roll-slide display device of claim 3, wherein the first adhesive film and the second adhesive film are made of an optically clear adhesive (OCA) film.

5. The roll-slide display device of claim 1, wherein a first portion of the third area adjacent to the first area covers a front surface of the second frame and a second portion of the third area covers a rear surface of the second frame.

6. The roll-slide display device of claim 1, wherein the second area is positioned at the rear surface of the roll-slide display device and is not directly coupled to the second frame.

7. The roll-slide display device of claim 1, wherein the second frame includes:
   a second front portion positioned at a rear surface of the first front portion; and
   a third rear portion covering a rear surface of the second rear portion, and
   wherein the second front portion supports the third area of the flexible display unit in the extended state.

8. The roll-slide display device of claim 7, wherein the support frame is disposed between the flexible display unit and the second front portion in the extended state.

9. The roll-slide display device of claim 1, wherein the plurality of bridges have a thickness less than a thickness of the plurality of ribs so that a stress applied to the plurality of bridges during folding and sliding of the flexible display unit can be less than a yield stress.

10. The roll-slide display device of claim 1, further comprising:
    a foam disposed between the display panel and the support frame; and
    an adhesive film disposed between the foam and the support frame.

11. The roll-slide display device of claim 1, further comprising:
    an elastomer disposed between the display panel and the support frame,
    wherein the elastomer is made of rubber or silicone and is directly attached to the support frame through hot pressing.

12. The roll-slide display device of claim 11, wherein the elastomer fills empty spaces between the plurality of ribs.

13. A roll-slide display device, comprising:
    a first frame;
    a second frame;
    a third frame; and
    a flexible display unit including:
       a display panel; and
       a support frame disposed on a rear surface of the display panel and including a plurality of ribs that are elongated in one direction, a plurality of holes between the plurality of ribs, and a plurality of bridges that connect the plurality of ribs to each other and are integrated with the plurality of ribs to form one body,
    wherein the flexible display unit is movable between an original state and an extended state by sliding the first frame with respect to the second frame, and
    wherein the first frame includes:
       a front portion coupled to a first area;
       a first rear portion positioned at a rear surface of the flexible display unit and exposed to an outside in the original state and in the extended state; and a second rear portion covered by a second area and a third area in the original state and which is exposed in the extended state.

14. The roll-slide display device of claim 13, further comprising a roller provided inside of the second frame and contacting an inner surface of the flexible display unit.

15. The roll-slide display device of claim 14, wherein during sliding of the first frame, the roller rotates along with movement of the flexible display unit.

16. The roll-slide display device of claim 15, wherein the second frame includes a side frame to protect a portion of the flexible display unit that is wound around the roller.

17. The roll-slide display device of claim 13, further comprising a camera and an antenna positioned on the first frame.

18. The roll-slide display device of claim 13, further comprising:
   a foam disposed between the display panel and the support frame; and
   an adhesive film disposed directly between the foam and the support frame.

19. The roll-slide display device of claim 13, further comprising an elastomer disposed between the support frame and the flexible display unit and disposed inside the plurality of holes.

* * * * *